United States Patent [19]

Hooykaas

[11] Patent Number: 5,376,283
[45] Date of Patent: Dec. 27, 1994

[54] FIXANT AND MATRIX FOR FIXING TOXIC ORGANIC COMPOUNDS IN WASTE MATERIAL

[75] Inventor: Carel W. J. Hooykaas, Rotterdam, Netherlands

[73] Assignee: Pelt & Hooykaas B.V., Rotterdam, Netherlands

[21] Appl. No.: 782,621

[22] Filed: Oct. 25, 1991

[30] Foreign Application Priority Data

Oct. 25, 1990 [NL] Netherlands .......... 9002335

[51] Int. Cl.$^5$ .......... C04B 28/02; C02F 1/52
[52] U.S. Cl. .......... 210/751; 106/697; 106/714; 106/718; 106/DIG. 4; 588/252; 588/257
[58] Field of Search .......... 210/751; 106/697, 706, 106/707, 709, 714, 718, 721, 789, 790, 811, DIG. 4; 588/205, 252, 253, 257

[56] References Cited

U.S. PATENT DOCUMENTS

| | | | |
|---|---|---|---|
| 3,720,609 | 3/1973 | Smith et al. | 210/751 |
| 4,124,405 | 11/1978 | Quienot | 106/697 |
| 4,142,912 | 3/1979 | Young | 210/751 |
| 4,209,335 | 6/1980 | Katayama et al. | 106/89 |
| 4,615,809 | 10/1986 | King | 210/751 |
| 4,822,496 | 4/1989 | Griffiths et al. | 210/721 |
| 4,855,083 | 8/1989 | Kagawa et al. | 210/751 |
| 4,861,709 | 8/1989 | Watanabe et al. | 106/719 |
| 5,304,709 | 4/1994 | Babcock et al. | 106/697 |

FOREIGN PATENT DOCUMENTS 1009775 5/1977 Canada .
2149546 3/1973 France .

*Primary Examiner*—Thomas Wyse
*Attorney, Agent, or Firm*—Levine & Mandelbaum

[57] ABSTRACT

A fixant for fixing toxic organic compounds comprised in waste material comprising an inorganic binder based on calcium compounds mixed with an alumino silicate, and at least one metal sulphate which fixes said organic compounds and counteracts leaching, is disclosed. Preferably a combination of several metal sulphates, especially aluminum sulphate, manganese sulphate and ferric sulphate is used. Moreover, the fixant preferably comprises an organo-clay compound, in particular a bentonite, a montmorillonite and a hectorite.

A process of treating waste material comprising toxic organic compounds by mixing said waste material with said fixant, as well as a matrix formed from at least a set inorganic binder based on a cement and a silicate with environmentally harmful organic compounds containing waste material encapsulated therein, said matrix also comprising at least one metal sulphate which fixes said organic compounds and counteracts leaching is disclosed.

7 Claims, No Drawings

FIXANT AND MATRIX FOR FIXING TOXIC ORGANIC COMPOUNDS IN WASTE MATERIAL

BACKGROUND OF THE INVENTION

The invention relates to a matrix formed from a set inorganic binder with environmentally harmful organic compounds containing waste material encapsulated therein.

DISCLOSURE OF THE PRIOR ART

A material of this type is known and is used for construction purposes or stored as such in the ground. The matrix is based on cement and formed by mixing the waste material in an aqueous medium with a cement and a silicate, for example in the form of fly ash, followed by allowing this composition to set with the formation of a rock-like product.

Although environmentally harmful organic compounds can be encapsulated in this way, it has been found that the bond between these organic compounds is not very strong, as a result of which they can easily be leached out by groundwater or rainwater.

In order to overcome this disadvantage it is known to use organic substances adsorbed on an additive. Additives mentioned in the literature are types of clay modified with alkylammonium compounds, the interlamellar distance between the layers of the clay being enlarged and the adsorption surfaces of the clay being opened in order to increase the adsorption of organic molecules, while, in addition, the adsorption surfaces of the clay are rendered no longer hydrophilic but organophilic.

One drawback of such types of clay, which are modified in particular with alkylammonium compounds, is that following adsorption of the organic compounds the interlamellar spacings between the layers of the types of clay are retained, as a result of which desorption of the organic compound from the type of clay is still possible, with the consequence that the organic compounds can easily be leached out again from the matrix formed.

SUMMARY OF THE INVENTION

A matrix has now been found which does not have the disadvantages outlined above since the organic compounds are strongly bonded therein, as a result of which leaching is prevented.

The matrix according to the invention is consequently characterised in that at least one metal sulphate which fixes organic compounds and counteracts leaching is incorporated in the matrix.

Preferably, the metal incorporated in the matrix has an ionisation energy of between 5.8 and 8 eV. Specifically, it has been found that metals of this type are able to bind the organic compounds in such a way that after formation of the matrix no further leaching takes place, even after a prolonged period.

The metal used is expediently a metal which forms a bridge between the organic compound and the binder. The consequence of the presence of such a metal is that the organic compound can be encapsulated in the form of a complex in the matrix, so that a stronger bond can be obtained.

Preferably a combination of several, in particular three, metal sulphates are incorporated in the matrix.

The metal to be incorporated in the matrix is advantageously chosen from the group comprising Al, Mn, Fe, Ni and Cr, preferably from Al, Mn, Fe, or a combination thereof.

It has been found that if a combination of the metals aluminium, manganese and iron is present in the matrix the organic compounds, and in particular those organic compounds which contain an aromatic ring, can be encapsulated in a large amount is assumed that these metals form a ring structure in the matrix, as a result of which a bond is formed between the $\pi$ electrons of the aromatic ring and the metal ions.

An organo-clay compound is also preferably incorporated in the matrix.

As already explained above, it was known to incorporate organic compounds, adsorbed on types of clay modified with alkylammonium compounds, in a matrix. The combination of an organo-clay compound and a metal is, however, known only in the field of ion exchangers and not for the formation of a matrix in the manner according to the invention.

It is pointed out that owing to the presence of one or more metals in the matrix according to the invention, said matrix can be formed more rapidly. The metal present therefore also acts as hardening activator during the formation of the matrix.

It is also pointed out that the metal is preferably used in the form of a salt, expediently in the form of the sulphate.

The addition of sulphate ions is also found to promote the formation of ettringite structures.

It has been found that such structures have a very high absorption capacity for metal.

Although any type of organo-clay compound can be used according to the invention, it is preferable if the organo-clay compound is a smectite, in particular a bentonite, a montmorillonite and/or a hectorite. As is known, smectites are crystalline clay minerals having a layered aluminium silicate structure.

In clay minerals of this type the metal, or the metals, is or are presumably incorporated during the formation of the matrix according to the invention. During this process, however, the activity of the metal, or the metals, for fixing organic compounds is retained.

The organic compounds encapsulated in the matrix appropriately consist of organic compounds containing groups capable of dissociation, and/or organic compounds which have one or more unsaturations. Compounds of this type are able to form an ionic bond with the metals present in the matrix if groups capable of dissociation are present, or an electron bond if unsaturations are present.

Preferably, the encapsulated organic compounds are aromatic compounds. Such compounds are completely encapsulated between the metals present in the matrix, presumably by means of bonds with the $\pi$ electrons, and thus fixed.

It is pointed out that the inorganic binder to be used to form the matrix in question preferably consists of a calcium-containing cement, mixed with an aluminium silicate and/or aluminosilicate. The cement used is preferably Portland cement, while the aluminosilicate is preferably fly ash.

According to an effective alternative embodiment, the inorganic binder to be used to form the matrix in question consists of a calcium hydroxide compound.

It is remarked that a sludge comprising not only environmentally harmful organic compounds but also heavy metals, such as the metals belonging to the hydrogen sulfide group (such as Hg, Pb, Cu, Sn, As) can also be transferred into a matrix according to the invention, provided that the sludge is subjected to a pretreatment. This pretreatment aims to remove the heavy metals mainly and comprises the step of mixing the sludge with an aqueous solution of trimercapto-S-triazine-trisodium salt (15% b.w.) and an activated clay such as a smectite, preferably a bentonite, in an amount sufficient for absorbing and/or retaining the obtained precipitate. The liquor obtained by filtration of the obtained mixture or by removing the precipitate by any other means can thereafter by treated as indicated hereabove to obtain a matrix having environmentally harmful organic compounds encapsulated therein.

It will be clear that depending upon the effectiveness of the pretreatment, the thus obtained matrix will at least have traces of the heavy metals originally present in the sludge.

Further, it is remarked that the above pretreatment can also be effected as such or in combination with any other process of waste treatment and waste disposal.

The invention also relates to a fixant for fixing toxic organic compounds comprised in waste material, said fixant comprising an inorganic binder consisting of a cement based on calcium compounds mixed with an alumino silicate, and further comprising at least one metal suphate which fixes said organic compounds and counteracts leaching.

Preferably said fixant comprises a combination of several metal sulphates, chosen from the group comprising aluminium sulphate, manganese sulphate, ferric sulphate, nickel sulphate and chromium sulphate.

Expediently said fixant comprises a combination of aluminium sulphate, manganese sulphate and ferric sulphate.

The fixant according to the invention further comprises an organo-clay compound, in particular chosen from among the layered organo-clay compounds. A smectite is preferred, such as a bentonite, a montmorillonite or a hectorite.

Although the amount of sulphates may broadly vary in the fixant, a range from about 10 to 25% b.w., based on the weight of the fixant usually results in a matrix from which the enclosed aromatic compounds cannot be leached in detectable amounts.

Further, the amount of the organo-clay compound is preferably from about 30 to 50% b.w., based on the weight of the fixant.

The invention also relates to a method of treating waste material comprising toxic organic compounds by mixing said waste material with a fixant for fixing said waste material comprising an inorganic binder consisting of a cement based on calcium compounds, mixed with an alumino silicate, adding water to form a slurry and hardening of the obtained slurry, wherein said fixant further comprises at least one metal sulphate which fixes said organic compounds and counteracts leaching.

In the present process the fixant to be used preferably comprises a combination of several metal sulphates, chosen from the group comprising aluminium sulphate, manganese sulphate, ferric sulphate, nickel sulphate and chromium sulphates, preferably a combination of aluminium sulphate, manganese sulphate and ferric sulphate.

Expediently, the fixant to be used in the present process further comprises an organo-clay compound, in particular a layered organo-clay compound, especially a smectite, preferably a bentonite, a montmorillonite or a hectorite.

As already indicated above, it has been found that the addition of sulphate ions promotes the formation of ettringite structures, which have a very high absorption capacity for metals. It is thus possible to create a fairly high concentration of metals in the matrix to be formed, which on the one hand act as a hardening activator during the formation of the matrix, and on the other hand combine and fix a fairly high concentration of organic compounds, present in the waste material.

The amount of the respective metal sulphates used in the method according to the invention is preferably from about 10 to 25% b.w., based on the weight of said fixant, whereas the amount of the organo-clay compound is from about 30 to 50% b.w. based on the weight of the fixant.

Other claims and many of the attendant advantages will be more readily appreciated as the same becomes better understood by reference to the following detailed description.

DESCRIPTION OF THE PREFERRED EMBODIMENTS

EXAMPLE 1

A soil sample which contains the following impurities was used:

$\alpha$-hexachlorocyclohexane: 20,000–40,000 $\mu g/kg$
$\beta$-hexachlorocyclohexane: 2,750–15,000 $\mu g/kg$
$\gamma$-hexachlorocyclohexane: 100–500 $\mu g/kg$ An amount of 25% (w/w) of Portland cement and fly ash, mixed with aluminium sulphate, manganese sulphate and iron sulphate, was added to this soil sample, followed by 25% (w/w) of water. After complete hardening and cryogenic grinding, the product obtained was subjected to solvent extraction using methanol/dichloromethane (30/70) in a fluid/solid ratio of 10/1.

The concentration of the abovementioned isomers in the extract was then determined with the aid of gas chromatography-mass spectroscopy. The results were as follows:

|   | | blank: |
|---|---|---|
| $\alpha$-hexachlorocyclohexane | 7 $\mu g/l$ | < 0.3 $\mu g/l$ |
| ($\beta$ + $\gamma$)-hexachlorocyclohexane | 280 $\mu g/l$ | < 0.7 $\mu g/l$ |
| $\delta$-hexachlorocyclohexane | 0.8 $\mu g/l$ | < 0.3 $\mu g/l$ |

EXAMPLE 2

Example 1 was repeated except that a mixture was used which, in addition to Portland cement, fly ash, aluminium sulphate, manganese sulphate and iron sulphate, also contained a clay of the bentonite type. The amount of this mixture which was used was again 25% (w/w).

The values obtained after extraction with methanol/dichloromethane (30/70) were as follows:

|   | | blank: |
|---|---|---|
| $\alpha$-hexachlorocyclohexane | <0.3 $\mu g/l$ | < 0.3 $\mu g/l$ |
| ($\beta$ + $\gamma$)-hexachlorocyclohexane | <0.7 $\mu g/l$ | < 0.7 $\mu g/l$ |
| $\delta$-hexachlorocyclohexane | <0.3 $\mu g/l$ | < 0.3 $\mu g/l$ |

The use of a combination of the abovementioned metals and an organo-clay therefore makes it possible, in the presence of aromatic compounds, to form a matrix from which these compounds can no longer be leached in detectable amounts.

EXAMPLE 3

In this example a sample was used which contained the following impurities:
- 75 dpm benzene
- 150 dpm chlorobenzene
- 10 dpm m-xylene
- 10 dpm 1,1-dichloroethane
- 10 dpm 1,3-dichloropropene
- 10 dpm carbon tetrachloride
- 10 dpm ethylbenzene This material was mixed with an amount of 15% by weight of the mixture of Portland cement, fly ash and bentonite and metal salts used in Example 2, and then mixed with water, after which, following complete hardening over a period of 30 days, a hard product was formed.

Following extraction with methanol, no further impurities were detectable in the extracts.

EXAMPLE 4

Example 1 was repeated except that a soil sample, contaminated with benzene was now used.

The hard product formed was ground and subjected to solvent extraction as described in the preceding examples. No benzene detected in the methanol extracts.

EXAMPLE 5

In this example a soil sample was used which contains, besides organic impurities, also salts of Hg, Pb, Cu and traces of Sn and As.

To remove these impurities, consisting of the heavy metals, the soil sample was subjected to a pretreatment consisting of adding an aqueous solution of trimercapto-S-triazine-trisodium salt (preferably 15% b.w.) as well as an activated clay, such as a smectite, expediently a bentonite. The amount of materials used depends, of course, upon the amount of impurities to be removed and can easily be determined in a preliminary test.

It is also possible to add trimercapto-S-triazine-trisodium salt as a solid composition to a slurry comprising the waste material to be purified, said solid composition having a concentration of the active salt of about 55%.

After thoroughly mixing the different components, the mixture was left to settle whereafter the liquor was treated as is indicated in example 2. Instead of said settlement it is of course also possible to subject the obtained mixture to filtration. The matrix obtained showed the same characteristics as indicated in Example 2.

It is remarked that the above pretreatment can also be effected separately or in combination with any other process of removing impurities from sludges.

What is claimed is:

1. A fixant for fixing toxic organic compounds present in waste material, said fixant comprising an inorganic binder comprising Portland cement bentonite, granulated blast furnace slags, manganese sulfate, and ferric sulfate, to fix said organic compounds by forming a coordination complex between ions of said sulfate and the waste material.

2. A fixant according to claim 1, wherein said inorganic binder further comprises aluminium sulphate.

3. A fixant according to claim 1, wherein the amount of the respective metal sulphates is from 10 to 25% b.w. based on the weight of the fixant.

4. A fixant according to claim 1, wherein the amount of bentonite is from 30 to 50% b.w., based on the weight of the fixant.

5. A fixant according to claim 1, further comprising at least one metal sulphate selected from the group consisting of nickel sulfate and chromium sulfate.

6. A matrix comprising an inorganic binder comprising Portland cement, bentonite, granulated blast furnace slags, magnesium sulfate, ferric sulfate and environmentally harmful organic compounds containing waste material encapsulated therein, wherein said sulphates fix said organic compounds and counteract leaching.

7. Matrix according to claim 6, wherein the encapsulated environmentally harmful organic compounds are organic compounds which contain groups capable of dissociation and/or have one or more unsaturations.

* * * * *